April 8, 1941.　　　　L. PARSONS ET AL　　　　2,237,687
SPRAYING DEVICE
Filed Aug. 23, 1939　　　3 Sheets-Sheet 1
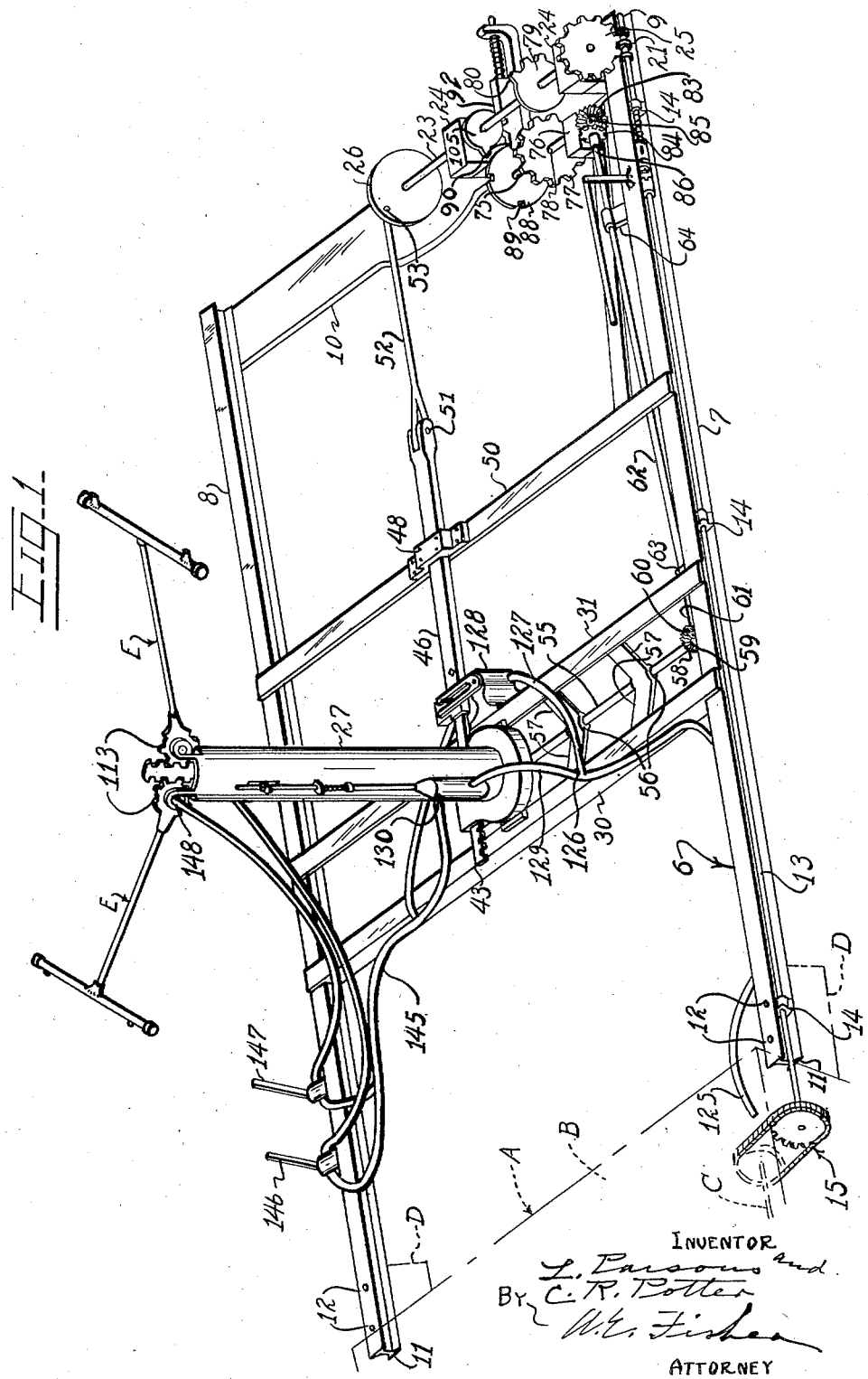

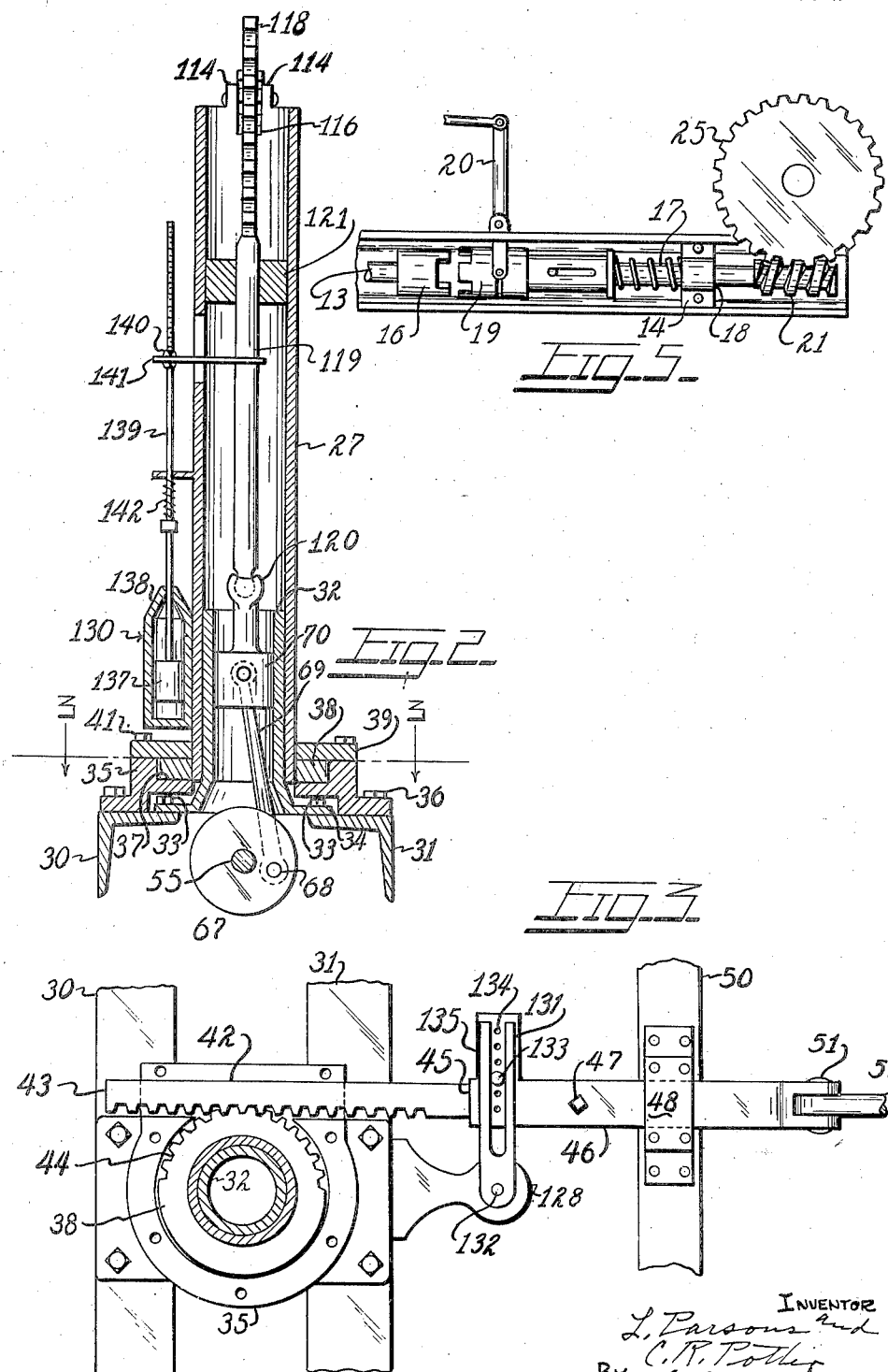

April 8, 1941.  L. PARSONS ET AL  2,237,687
SPRAYING DEVICE
Filed Aug. 23, 1939  3 Sheets-Sheet 3

INVENTOR
L. Parsons
C. R. Potter
BY  A. E. Fisher
ATTORNEY

Patented Apr. 8, 1941

2,237,687

UNITED STATES PATENT OFFICE 2,237,687

SPRAYING DEVICE

Lee Parsons and Charles R. Potter, Sonoma, Calif.

Application August 23, 1939, Serial No. 291,480

2 Claims. (Cl. 299—37)

This invention relates to spraying devices and has for its primary object to provide a mechanism which may be mounted upon a spray wagon of conventional type and employed to direct a spray of insecticide in a sweeping motion to either side thereof on the trees of an orchard as the wagon is driven alongside the trees.

Another object of this invention is to provide a spraying device to be mounted upon a wagon or truck for directing a stream of insecticide upon trees or the like from top to bottom and from side to side thereof, said device comprising an oscillating turret mounted upon a supporting structure, undulating arms at the top thereof for emitting the insecticide, and control mechanism for selectively governing the movement of the turret and arms.

A further object of this invention is to provide such a device wherein the power for thus actuating the spray elements is derived from the regular mixing mechanism of the spray wagon which tows or carries the spraying device.

The foregoing and other more specific objects of the invention will be made apparent in the course of the following detailed specification, reference being had to the accompanying drawings forming a part of this specification, wherein:

Figure 1 is a perspective view of the spraying device showing same as attached to a spraying wagon or truck and showing only the rear portion of the spraying wagon in broken lines.

Figure 2 is an enlarged vertical section through the spray arm supporting and actuating elements.

Figure 3 is a horizontal section along the lines 3—3 in Figure 2, the pitman and crank being removed therefrom.

Figure 5 is an enlarged fragmental side elevation of the control clutch of the device.

Figure 4:
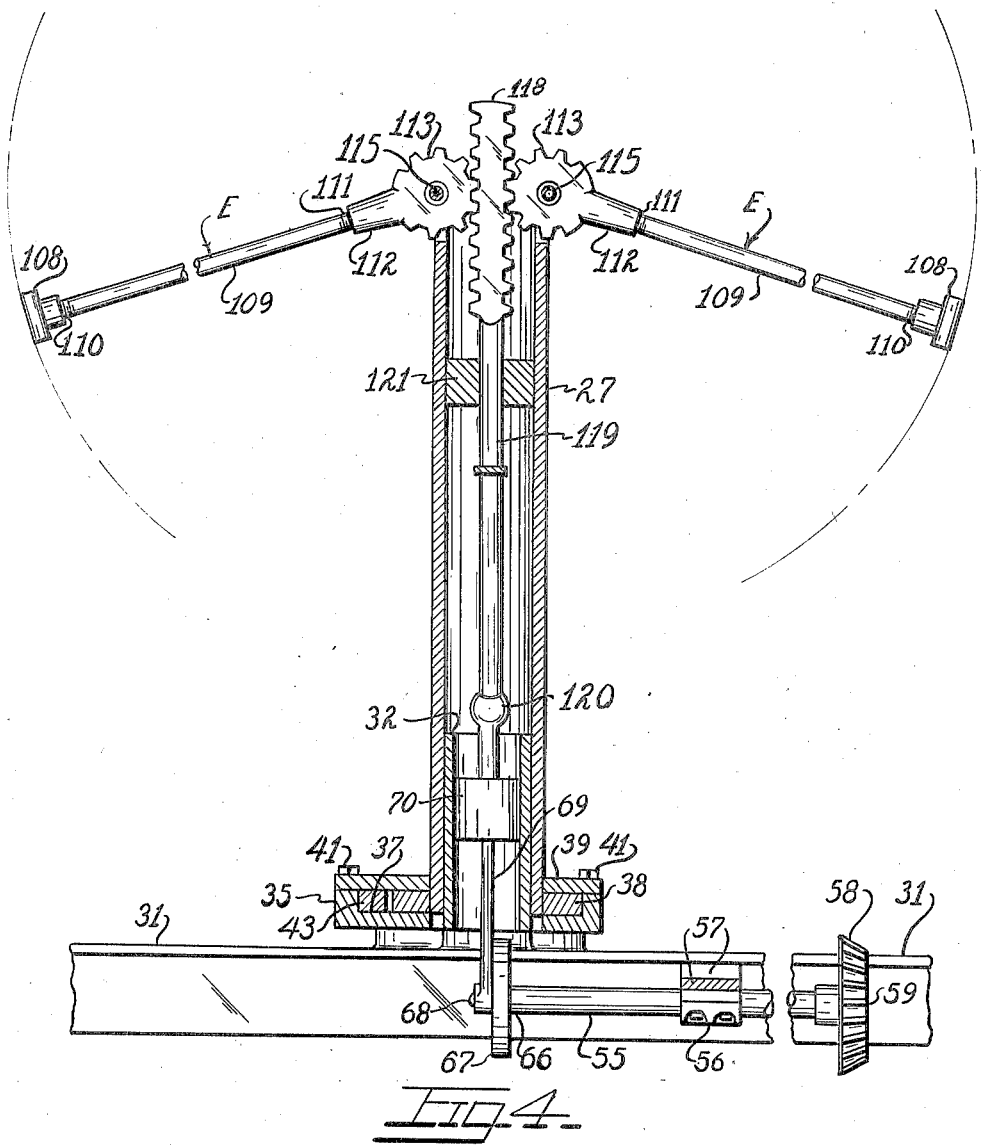
Figure 4 is a view similar to Figure 2 but taken along a sectional line at right angles to that view.
Figure 6:
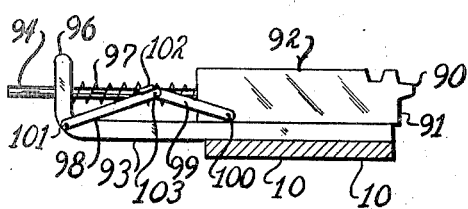
Figure 6 is a partial side view of the vertical time locking mechanism.

Referring now with more particularity to the drawings, the character A designates the rear portion of a conventional sprinkling wagon or truck having the tank or vat B in which the liquid insecticide is carried and which is constantly agitated by a conventional mixing device (not shown) actuated by a power shaft C which is in turn rotated by any suitable means. The frame of the wagon A terminates in rearwardly extended beams D.

The foregoing is a conventional equipment, here shown only for the purpose of illustrating the connection of the invention therewith. The chassis or frame 6 of this invention is composed of side bars 7 and 8 secured to one another, in a parallel spaced relationship, at the rearward ends 9 thereof, by means of a cross bar 10, the forward ends 11 of the side bars being bolted at 12 to the beams D of the sprinkling truck so as to support the chassis in a horizontally, rearwardly extended position. Mounted along the side bar 7 of the frame is a drive shaft 13 journaled in bearings 14 and connected at its frontal end by a sprocket and chain assembly 15 to the power shaft C so as to be driven thereby. Adjacent its rear end the drive shaft 13 carries a clutch head 16, and a stub shaft 17 journaled at 18 coaxially with the drive shaft carries the sliding clutch collar 19 which may be engaged or disengaged with the clutch head 16 by means of a hand lever 20. When the clutch is engaged the drive shaft 13, of course, drives the stub shaft 17 which in turn drives a worm gear 21, rigidly secured to the shaft 17. A shaft 23 of about half the length of the bar 10, is journaled through the bearing blocks 24 upon the said rear cross bar 10, and has a spur gear 25 rigidly secured thereto at the outer end thereof which is adapted to mesh with the worm gear 21 and to be driven thereby. A crank wheel 26 is rigidly secured to the other end of the shaft 23 for the purpose of oscillating the turret 27, as will be later described.

Two angle irons 30 and 31 are mounted transversely across the frame 6 at a medial point thereon and form a support for a vertically extended tubular cross head guide 32 which is mounted near the center of the frame and supported in an upright position by bolts 33 through its flange 34. A large base bearing 35 is secured by bolts 36 to the angle irons 30 and 31 and is channeled out at its upper inner face at 37 to rotatably receive the annular base flange 38 of the upright tubular spray arm turret 27. This turret 27 seats rotatably down over the guide 32 and is held in position by a cap washer 39 which is secured by bolts 41 down over the bearing 35. One side of the bearing 35 is recessed at 42 to slidably receive a gear toothed rack bar 43 which extends rearwardly, and meshes with gear teeth 44 cut in the adjacent portion of the turret flange 38. At its rear end 45 the rack bar 43 is slidably mounted in an extension sleeve 46 and is adapted to be held at any adjusted position therein by the bolt 47, working through a series of holes in the bar 43, thereby providing a means of shortening or lengthening the rack bar if for any reason it was found necessary to change the size of the crank wheel. The extension sleeve is slidably mounted in a bearing 48, which is secured to a cross bar 50 on the frame 6, and is, rearwardly of the bearing, pivotally connected by a pin 51 to a connecting rod 52 which is in turn pivotally connected to the crank wheel 26 by the pin 53. This assembly is thus effective to oscillate the turret 21 about its vertical axis as the shaft 23 rotates.

A jack shaft 55 is journaled transversely in the frame 6, below the turret assembly, by means of the bearings 56 secured to the cross bars 30 and 31 by the radially extended arms 57. A bevel gear 58 is rigidly secured to this jack shaft, at the outer end 59 thereof, and is adapted to mesh with a similar gear 60 rigidly positioned upon the forward end 61 of a connecting shaft 62, the shaft 62 being positioned at right angles to the jack shaft and extending rearwardly thereof. The shaft 62 is journaled through bearings 63 and 64 mounted upon the inner side of the side bar 7 of the frame 6. The inner end 66 of the jack shaft has a crank wheel 67 rigidly mounted thereon so as to be driven by the said shaft, and rotatably secured by a pin 68 near the margin of this crank wheel is a vertical connecting rod 69 extending upwardly into the guide 32 and there pivotally secured at its upper end to the cross head 70. This cross head is thus reciprocated as the crank wheel 67 rotates, the purpose of which will be later explained as will be the actuating elements.

A spindle shaft 75 is journaled through bearings 76 at either end thereof transversely the frame 6 near the rear cross bar 10 and in alignment with the shaft 23, the bearings 76 being mounted upon the frame 6. A spur gear 77 is anchored to the spindle shaft at 78 and is adapted to be intermittently driven by a partial gear 79 mounted upon the shaft 23, said gear 79 having teeth 80 only upon a sector of the whole, the sector being approximately one third of the whole gear. By this arrangement the spur gear 77 is not continuously driven, but only when the teeth 80 on the partial gear mesh with those of the spur gear, the partial gear 79 being driven by the shaft 23. A pair of bevel gears 83 and 84 are rigidly mounted upon the adjacent ends 85 and 86 of the shafts 75 and 62 respectively so that any rotation of the shaft 75 is transmitted, by the connecting shaft 62 and jack shaft 55, to the cross head 70. To insure no "back slip," that is, the shaft 75 turning backwards when the teeth on the gears 77 and 79 are not in mesh, a time locking arrangement is provided. This arrangement or mechanism comprises a timing gear 88 rigidly mounted upon the spindle shaft 75 inwardly of the spur gear 77, the said timing gear having four equally spaced recesses 89 formed in the periphery thereof for the reception of a locking tooth 90. This locking tooth is integrally formed and extended from the forward end 91 of a locking bar 92, said locking bar being slidably mounted upon a carriage 93 permanently mounted upon the cross bar 10 of the frame 6. This locking bar has an elongated pin or shaft 94 integrally formed therewith at the rearward end and extended backwardly slidably through the upwardly turned portion 96 of the carriage, a coiled expansion spring 97 being positioned about the shaft 94 between the rear end of the locking bar and the forward surface of the upturned portion of the carriage so as to hold the bar in a forwardly extended position. A pair of pivotally connected arms 98 and 99 are pivotally secured to the bar 92 at 100 and to the carriage at 101 for the purpose of holding the bar on the carriage against the force of the expansion spring. The arm 99 is provided with a stop flange 102 above the arm 98 at the pivot point 103 so that the arms will not come to rest "on center." The upper surface of the locking bar is toothed at the forward end 91 thereof and is adapted to be actuated by a single toothed gear 105, rigidly secured to the shaft 23, for locking the time gear 88. The locking bar 92, timing gear 88, single toothed gear 105, partial gear 79 and spur gear 77, in operation, are synchronized so that when the gears 77 and 79 mesh the single toothed gear 105 withdraws the locking bar 92 from the time gear 88 and permits the spindle 75 to rotate, and naturally when the gears 77 and 79 disengage the locking bar is released and the tooth 90 on the locking bar enters one of the recesses 89, thereby holding the spindle 75 immobile.

The spray elements E comprise apertured nozzles 108 of any desired shape or design threaded on arms 109 at the outer ends 110 thereof. The opposite ends 11 of the arms 109 are threaded into tapped radial extensions 112 of oscillating gears 113. These gears 113 are each pivotally mounted between pairs of ears 114 integrally extended upwardly at diametrically opposite points from the upper extremity of the turret 27, and are adapted to oscillate on a horizontal axis about the hollow pivot shafts 115. Slots 116 are provided in the turret between the pairs of ears 114 for the reception of the gears 113. The gears thus support the spray arms 109 so that they may oscillate in vertical planes at opposite sides of the turret. These gears are meshed with a double toothed rack bar 118 formed at the upper end of a rod 119 extended vertically downward through the turret and connected by a ball and socket joint 120 to the cross head 70. A bearing 121 mounted transversely within the turret supports the rod therein.

The liquid insecticide, carried within the vat B, is delivered to the spraying device by the flexible tube 125. This tube is divided at 126, one branch tube 127 being connected to a horizontal shut off valve 128 and the other branch tube 129 being connected to a vertical shut off valve 130. The above horizontal shut off valve is of conventional design and is secured to the medially positioned cross bar 31 by welding or the like. Instead of the conventional handle or lever control, a U-shaped lever 131 is rigidly secured to the valve stem 132, and is adapted to be operated by a pin 133 removably positioned in one of a number of apertures 134 in the rack bar extension sleeve 46. To increase the adjustability or control feature of this valve, the width of the extension sleeve 46 may be increased at 135 so that the pin 133 may be moved away from or towards the valve so as to effect an abrupt or delayed shut off of the insecticide. The vertical valve 130 has a piston 137 slidably positioned within the housing 138 controlling the flow of the liquid, said piston being actuated by an integrally connected upwardly extending rod 139 adjustably secured at 140 to a plate or lug 141 rigidly mounted upon the reciprocating rod 119. A tension spring 142 is provided for eliminating lost motion therein and also for aiding in returning the piston to the bottom of its stroke. Flexible tubing 145 interconnects these valves, on the outlet side, to each of a pair of manually controlled shut off valves 146 and 147, each of the said valves being independently connected at 148 to each of the spray arms by means of the pivot shafts 119.

In operation the spray arms are continuously oscillated in a horizontal plane by the toothed rack bar 43, the said arms being actuated by the rearwardly positioned crank 26. The arms are also simultaneously intermittently oscillated in a vertical plane by the crank 67, this crank being actuated by the aforementioned timing mechanism. During this time a spray of liquid is being discharged from the nozzles and as a result this liquid is thrown out in a sweeping orbital path such as will cause it to cover the entirety of a tree along which the device is pulled. The vertical and horizontal oscillating mechanisms are synchronized so that the arms during their vertical sweep come to rest at intervals, during this period of suspended vertical motion the horizontal sweep of the arms is continued, thereby spraying the trees from side to side in what might be referred to as layers. During the motion of the spraying arms the aforementioned valves are constantly in action regulating the flow of the insecticide so that a greater or less amount of the liquid is sprayed on the trees according to the position of the arms, that is when the arms are directed upon the dense part of the tree a greater quantity of liquid is sprayed thereon than when the arms are directed upon sparse parts of the trees, such as the top and trunk thereof.

From the foregoing description it is thought that the construction, operation and the use of this invention will be fully comprehended by one familiar with this art, and although a preferred embodiment of the invention has herein been set forth it is understood that the construction, combination and arrangement of the several parts may be changed as expediency may dictate not departing, however, from the spirit of the invention as set forth in the appended claims.

What is claimed is:

1. In a device of the kind described, a frame for attaching horizontally at the rear of a truck, a hollow turret rotatably mounted on the frame for oscillation on a vertical axis, spray arms pivoted to the turret for oscillation on horizontal axes, oscillating gears at the inner ends of the spray arms, a gear-toothed rack-bar reciprocably mounted through the hollow turret with the rack in mesh with the said oscillating gears, means for oscillating the turret, and separate means for reciprocating the rack-bar.

2. In a device of the kind described, a frame adapted for attaching to and extending horizontally from a truck, a hollow turret having a flanged base journaled on the frame for oscillation on a vertical axis, a portion of said flanged base being formed with gear teeth, a gear-toothed, turret rack-bar reciprocably mounted through the frame with the rack in mesh with the gear teeth of the turret base flange, means for reciprocating the turret rack-bar, spray arms pivoted to the upper end of the turret for oscillation on horizontal axes, oscillating gears at the inner ends of the spray arms, a gear toothed, spray-arm rack-bar reciprocably mounted through the hollow turret with the rack in mesh with the said oscillating gears, and means for reciprocating the said spray-arm rack bar.

LEE PARSONS.
CHARLES R. POTTER.